(12) United States Patent
Deivasigamani et al.

(10) Patent No.: US 12,117,321 B2
(45) Date of Patent: Oct. 15, 2024

(54) DIAGNOSTIC METHODS

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 338 days.

(21) Appl. No.: 17/736,152

(22) Filed: May 4, 2022

(65) Prior Publication Data

US 2023/0358581 A1   Nov. 9, 2023

(51) Int. Cl.
*G01F 1/34* (2006.01)
*F24H 15/104* (2022.01)
*G01F 15/00* (2006.01)
*G01F 15/06* (2022.01)

(52) U.S. Cl.
CPC ............ *G01F 1/34* (2013.01); *F24H 15/104* (2022.01); *G01F 15/005* (2013.01); *G01F 15/06* (2013.01)

(58) Field of Classification Search
CPC .......... G01F 1/34; G01F 15/005; G01F 15/06; F24H 15/104
See application file for complete search history.

(56) References Cited

U.S. PATENT DOCUMENTS

| | | | | |
|---|---|---|---|---|
| 3,786,921 A | * | 1/1974 | Johnson | E04H 4/129 |
| | | | | 210/130 |
| 9,169,829 B2 | * | 10/2015 | Nomaguchi | F03D 7/02 |
| 9,518,480 B2 | * | 12/2016 | Haraguchi | F02G 5/00 |
| 9,797,272 B2 | * | 10/2017 | Adachi | F03G 7/04 |
| 2010/0104439 A1 | * | 4/2010 | Nomaguchi | F03D 7/02 |
| | | | | 416/147 |
| 2015/0096297 A1 | * | 4/2015 | Haraguchi | F02G 5/02 |
| | | | | 60/618 |
| 2015/0330256 A1 | * | 11/2015 | Adachi | F03G 7/04 |
| | | | | 60/646 |
| 2023/0314045 A1 | * | 10/2023 | Deivasigamani | G01L 27/007 |
| | | | | 122/14.1 |

* cited by examiner

*Primary Examiner* — Tung S Lau
(74) *Attorney, Agent, or Firm* — Jong Patent Firm; Cheng Ning Jong; Tracy P. Jong

(57) ABSTRACT

A diagnostic method for verifying the proper functioning of flow devices of a fluid system including at least one of at least one fluid heater, a bypass conductor connected in parallel to the at least one fluid heater, a bypass valve configured to control flow through the bypass conductor, at least one flow valve for controlling a fluid flow through the fluid system, at least one pump, at least one pressure sensor for obtaining a pressure of the fluid flow and at least one flow sensor for obtaining a flowrate of the fluid flow. The method includes selectively turning on and off the bypass valve and the at least one pump and obtaining pressure measurements at various times during the execution of the diagnostic method to identify the health of the at least one pressure sensor and the at least one pump.

6 Claims, 3 Drawing Sheets

DIAGNOSTIC METHODS

BACKGROUND OF THE INVENTION

1. The Field of the Invention

The present invention relates generally to a diagnostic method for an appliance. More specifically, the present invention is directed to a fluid system test configured to detect fluid system anomalies such that these anomalies may be addressed timely and such that alternative control strategies can be implemented in the interim.

2. Background Art

In a conventional fluid system, the health of the system is not actively verified prior to the system being put in use to service customers. For instance, with a hot water heater, hot water is simply requested for a short period of time upon installation to verify that the hot water heater can indeed provide hot water. Errors that occur and detected during normal operations can cause unplanned equipment shutdown over a prolonged period of time and untold economic impacts. Further, if no plans are put in place to aid a system in "limping along" until further corrective actions can be taken or to detect an anomaly at an earliest opportunity, a prolonged shutdown can exacerbate the problem, especially when the same fluid system also serves numerous customers.

There exists a need for a fluid system capable of self-tests and one capable of self-tests at opportune times so as to hasten the discovery of problems associated with the fluid system and that the problems may be addressed timely.

SUMMARY OF THE INVENTION

In accordance with the present invention, there is provided a diagnostic method for verifying the proper functioning of flow devices of a fluid system including at least one of at least one fluid heater, a bypass conductor connected in parallel to the at least one fluid heater, a bypass valve configured to control flow through the bypass conductor, at least one flow valve for controlling a fluid flow through the fluid system, at least one pump, at least one pressure sensor for obtaining a pressure of the fluid flow and at least one flow sensor for obtaining a flowrate of the fluid flow, the method including:
- (a) determining if the fluid flowrate as sensed by the at least one flow sensor is under a threshold, if the fluid flowrate is under the threshold, closing the bypass valve, turning off the at least one pump, obtaining a first pressure reading using the at least one pressure sensor at a first time;
- (b) turning on the at least one pump and obtaining a second pressure reading using the at least one pressure sensor at a second time, the second time is a first delay from the first time, determining whether a pressure increase has occurred from the first time to the second time by comparing the second pressure reading to the first pressure reading;
- (c) if the second pressure reading is greater than the first pressure reading, closing the bypass valve, turning off the at least one pump, obtaining a third pressure reading using the least one pressure sensor at a third time, opening the bypass valve upon a second delay from the second time and obtaining a fourth pressure reading using the at least one pressure sensor at a fourth time, otherwise raising a pump alert and closing the bypass valve; and
- (d) determining whether a pressure increase has occurred from the third time to the fourth time by comparing the fourth pressure reading to the third pressure reading, if the fourth pressure reading is greater than the third pressure reading, raising a flow sensor fault, otherwise turning on the at least one pump and obtaining a fifth pressure reading using the at least one pressure sensor at a fifth time; and if the fifth pressure reading is greater than the third pressure reading, raising a flow sensor fault, otherwise raising a bypass alert and closing the bypass valve. In one embodiment, the threshold is about 1 GPM.

In accordance with the present invention, there is further provided a diagnostic method for verifying the proper functioning of flow devices of a fluid system including at least one of at least one fluid heater, a bypass conductor connected in parallel to the at least one fluid heater, a bypass valve configured to control flow through the bypass conductor, at least one flow valve for controlling a fluid flow through the fluid system, at least one pump, at least one pressure sensor for obtaining a pressure of the fluid flow and at least one flow sensor for obtaining a flowrate of the fluid flow, the method including:
- (a) obtaining a first value corresponding to a pressure of the fluid system using the at least one pressure sensor and comparing the first value to an extreme low pressure threshold and an extreme high pressure threshold, if the first value is less than the extreme low pressure threshold, transitioning a state of the at least one pressure sensor to a pressure sensor shorted fault state, if the first value is greater than the extreme high pressure threshold, transitioning the state of the at least one pressure sensor to a pressure sensor open fault state, if the first value falls between the extreme high pressure threshold and the extreme low pressure threshold, transitioning the state of the at least one pressure sensor to an operating state; and
- (b) obtaining a second value corresponding to a pressure of the fluid system using the at least one pressure sensor, while disposed in the operating state, if the second value exceeds a high pressure threshold, transitioning the state of the at least one pressure sensor to the pressure sensor open fault state, while disposed in the operating state, if the second value is less than a low pressure threshold, transitioning the state of the at least one pressure sensor to the pressure sensor shorted fault state, wherein the extreme high pressure threshold is greater than the high pressure threshold, the high pressure threshold is greater than the low pressure threshold and the low pressure threshold is greater than the extreme low pressure threshold.

In one embodiment, the operating state further includes a high pressure alert substate, a low pressure fault substate, a pressure sensor check substate and pressure within a suitable operating pressure range substate, the step of transitioning the state of the at least one pressure sensor to the operating state is a transition of the state of the at least one pressure sensor to the pressure within a suitable operating pressure range substate. In one embodiment, the expiration of a timer causes the state of the at least one pressure sensor to transition to the pressure sensor check substate in which a third value corresponding to a pressure of the fluid system is obtained using the at least one pressure sensor, if the third value is determined to be above a high pressure alert threshold, the state of the at least one pressure sensor transitions to the high pressure alert substate and if the third value is determined to be below a lower pressure fault threshold, the state of the at least one pressure sensor transitions to the low pressure fault substate. In one embodiment, the extreme high pressure threshold is about 4.75 V of a 5 V system and the extreme low pressure threshold is about 0.25 V of a 5 V system. In one embodiment, the high pressure threshold is about 4.5 V of a 5 V system and the extreme low pressure threshold is about 0.5 V of a 5 V system. In one embodiment, the high pressure alert threshold is about 170 psi and the low pressure fault threshold is about 30 psi.

An object of the present invention is to provide a diagnostic method useful for identifying the specific component/s or device/s of a system which have malfunctioned such that the system can continue to function based on alternative component/s or device/s while the malfunctioned component/s or device/s are awaiting service or repair at a later time.

Another object of the present invention is to provide service personnel sufficient information regarding the malfunctions of a system to remove the need for an additional on-site diagnosis to identify the malfunctions.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—cold water supply manifold
4—hot water supply manifold
6—receiving end of cold side conductor
8—exit end of hot side conductor
10—water heating system
12—system inlet temperature sensor
14—system outlet temperature sensor
16—bypass conductor
18—valve
20—cold side conductor
22—hot side conductor
24—pump
26—heat exchanger inlet temperature sensor
28—heat exchanger outlet temperature sensor
30—package including flow valve, flow sensor
32—exit nozzle of heat exchanger
34—heat exchanger
36—step of taking flowrate readings
38—step of closing bypass valve, shutting down pump and taking water pressure measurement/s
40—step of turning on pump and taking water pressure measurement/s
42—step of raising pump alert and closing bypass valve
44—step of closing bypass valve, shutting down pump and taking water pressure measurement/s
46—step of opening bypass valve and taking water pressure measurement/s
48—step of raising flow sensor fault
50—step of turning on pump and taking water pressure measurement/s
52—step of raising flow sensor fault
54—step of raising bypass alert and closing bypass valve
56—pressure sensor open fault state
57—initialization state
58—pressure sensor shorted fault state
59—operating state
60—pressure sensor value check substate
62—high pressure alert substate
64—low pressure fault substate
66—suitable operating pressure range substate

PARTICULAR ADVANTAGES OF THE INVENTION

The present method is useful for identifying the specific component/s or device/s of a system which have malfunctioned. As any malfunctions are identified upon their occurrences, these malfunctions can be communicated in real time to service personnel via, e.g., the internet, during the operations of the fluid system. Service personnel can therefore prepare for the upcoming repairs or replacements that may need to be made by attending to the service call with correct replacement parts. Any malfunctioned fluid systems in question can therefore be repaired and put back in service as soon as possible. Further, the skill level required of the service personnel responsible for servicing a fluid system can be drastically reduced as the diagnostic method aids in identifying one or more problematic flow devices.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
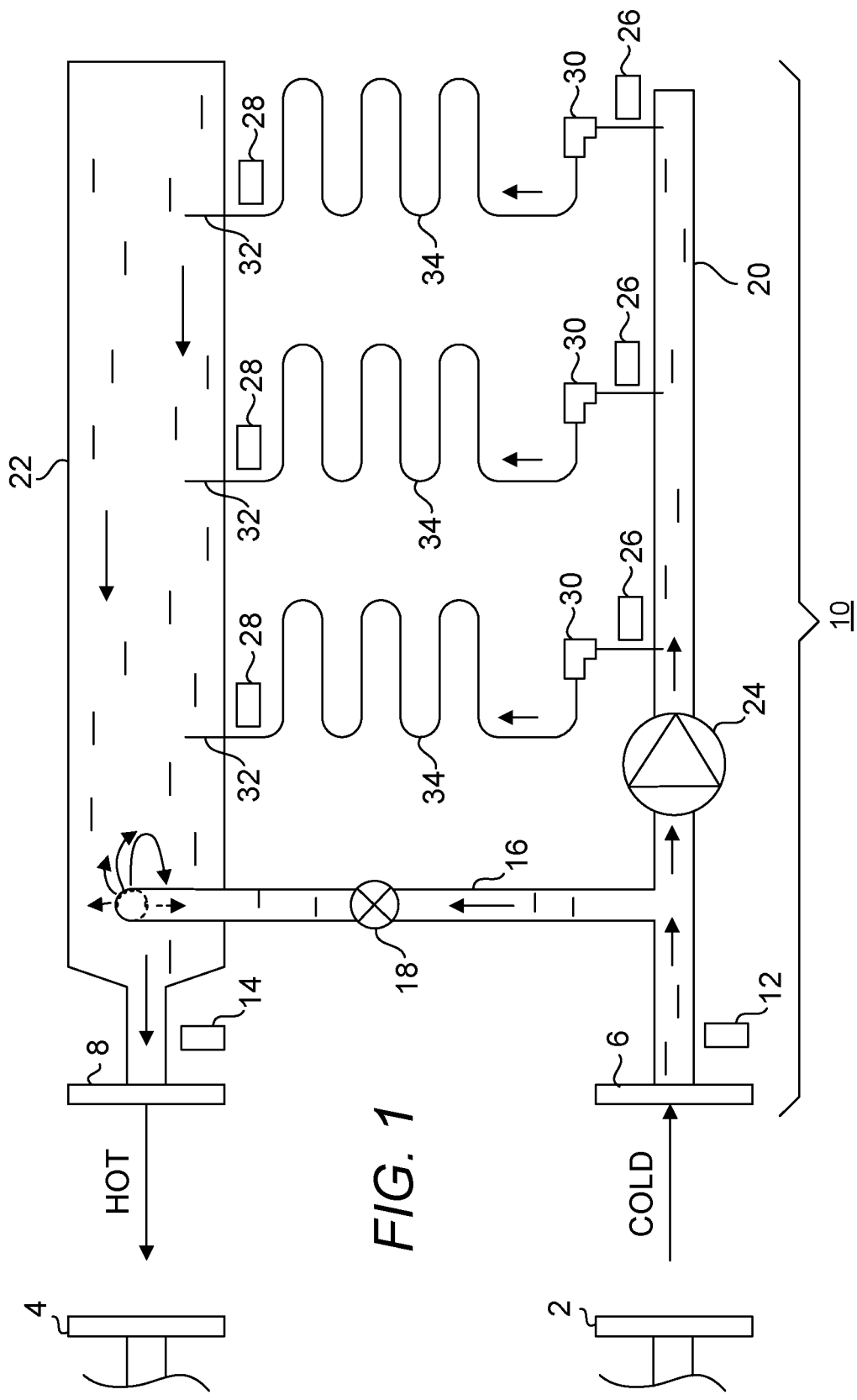
FIG. 1 is a diagram depicting one embodiment of a water heating system where one or more heat exchangers are used and the water heating system includes a bypass conductor.

FIG. 1 is a diagram depicting one embodiment of a water heating system where one or more heat exchangers are used and the water heating system includes a bypass conductor.

The water heating system 10 includes a cold side conductor 20, a hot side conductor 22, a pump 24, a bypass conductor 16, at least one heat exchanger 34, a heat exchanger inlet temperature sensor 26 disposed on the inlet of one of the three heat exchangers 34, a heat exchanger outlet temperature sensor 28 disposed at an outlet or exit nozzle 32 of one of the three heat exchangers 34, a system outlet temperature sensor 14 disposed on the exit end of the hot side conductor 22 and a system inlet temperature sensor 26 disposed on the receiving end of the cold side conductor 20. As shown, each heat exchanger has its own inlet temperature sensor. However, in this embodiment, only one inlet temperature sensor is used as each heat exchanger experiences a flow originating from a common source. As shown, each heat exchanger has its own outlet temperature sensor. The cold side conductor 20 includes a receiving end and a closed end. The hot side conductor 22 includes an exit end and a closed end. In one embodiment, the hot side conductor 22 is configured to hold a volume of water of from about 0.5 to about 2 gallons. In one embodiment, the fluid conductor of a heat exchanger 34 is a tubing having a size of about ¾ inch. The bypass conductor 16 includes a first end and a second end, wherein the first end of the bypass conductor 16 is fluidly adapted to the receiving end of the cold side conductor 20 and the second end of the bypass conductor is fluidly adapted to the exit end of the hot side conductor 22. In one embodiment, the bypass conductor 16 is a tubing having a size of from about 0.5 to about 1.5 inches. Each heat exchanger 8 includes a flow valve of a package 30. The pump 24 increases pressure of water delivered to points of use and negates the pressure drop across heat exchangers 34. Although, with the positive pressure generated by the pump 24, delivery of water is considered satisfactory for some, for others, the increased pressure may come as a surprise, e.g., when used in a sink or shower. The receiving end 6 of the cold side conductor 20 is configured to be connected to a cold water supply manifold 2 or a port where unheated incoming water is supplied. The exit end 8 of the hot side conductor 22 is configured to be connected to a hot water supply manifold 4 or a port where now heated or hot water is sent out of the water heater and eventually to points of use. The pump 24 is configured to generate a flow through each of the heat exchangers 34. Shown in FIG. 1 are three heat exchangers 34 although any suitable number of heat exchangers may be used to collectively meet the demand requested through the hot water supply manifold 4 by hot water users. A valve 18 is provided to control flow through the bypass conductor 16. This valve 14 is normally disposed in the open state, except when two conditions have been encountered. First, if system outlet temperature sensor 14 has been determined to have ceased functioning and when it is relied upon for generating hot water, e.g., as inferred from a sudden loss of input signals from this sensor, valve 18 is closed to prevent any flow through it. In producing hot water, unheated water is simply received at 6, sent through the cold side conductor 20 before entering the heat exchangers 34 to be heated. Heated water empties into the hot side conductor 22 and proceeds to exit via the hot side conductor 22. Second, if the pump 24 has been determined to have ceased to function, e.g., as inferred from a lower than expected flowrate detected at any one of the flow valves of package 30, valve 18 is also closed to prevent any flow through it. A failed pump 24 does not prevent a flow that is caused by a hot water demand at one or more points of use. If a pump has been determined to have failed, hot water demands are serviced in the same manner as in the case where the system outlet temperature sensor 14 has failed. In general, a failure can be logged for purposes of problem diagnosis at a later time. It may also be communicated to service personnel in real time or at a later time. As shown herein, each heat exchanger 34 is equipped with an inlet temperature sensor 26 and an outlet temperature sensor 28. If any one of the inlet temperature sensors fails, at least one of the remaining functional inlet temperature sensors is relied upon until the condition is corrected. Alternatively, a system inlet temperature sensor 12 may be used to provide a rough representation for any one of the heat exchangers 34. If any one of the outlet temperature sensors fails, at least one of the remaining functional outlet temperature sensors is relied upon until the condition is corrected. These limp along modes prevent the need for a complete shutdown of the water heating system such that the water heating system can continue to service points of use until corrective actions can be taken. It is critical for the water heating system to remain operational even when at least one of the flow devices of the system has malfunctioned, until such time when the system can be repaired. Therefore, the earliest opportunity for such a system to self-diagnose is during a power-on process of the system as shown in the ensuing figures. During the first power-up process upon installation of a fluid system, service personnel responsible for installation are typical on-site and ready to address any issues that arose from the power-up self test of the fluid system. It typically is not an option to cycle up a water heating system when there are no requests for hot water as deadheading of the system is undesirable when the pump is turned on. The power-on self-test is akin to a test of an exerciser. An exerciser refers to a diagnostic routine executed or run outside of a normal operation of a tested device. The diagnostic routine may involve deliberately turning on or off one or more components at various times and in various sequences to produce responses or property changes of the tested device such that they may be obtained and evaluated in order to determine whether the responses meet expected results. This diagnostic routine is normally undesired as a request for hot water would involve all components or devices of the water heating system, for extended periods of time, that contribute to water heating to cycle up and cause undesirable deadheads. However, a fluid system shown in FIG. 1 includes a bypass conductor which serves a path for the fluid system to avoid deadheads as recirculations can occur within the fluid system itself.

Figure 2:
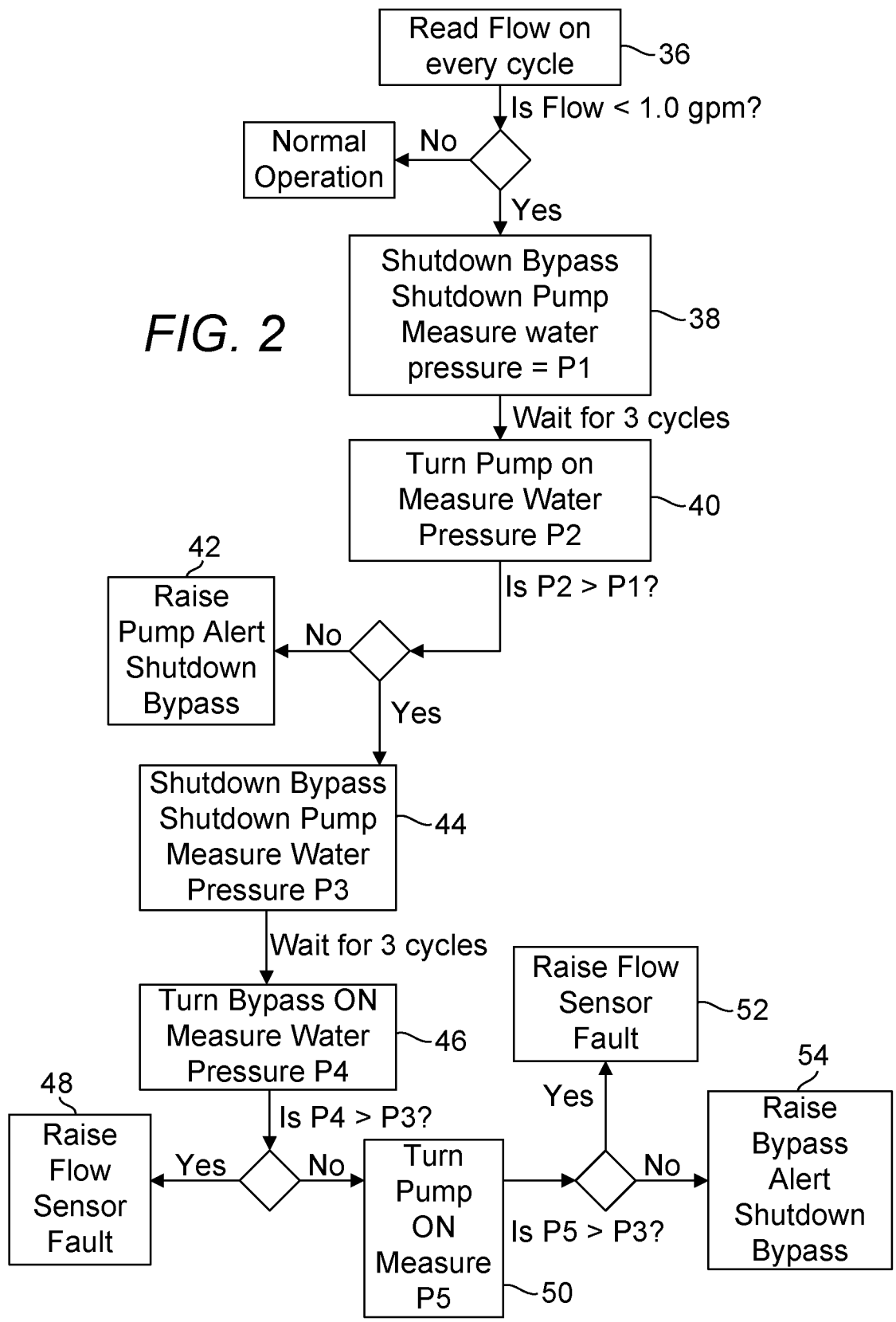
FIG. 2 is a diagram depicting a diagnostic method useful for ascertaining the proper functioning of one or more flow devices of a fluid or water heating system.

FIG. 2 is a diagram depicting a diagnostic method useful for ascertaining the proper functioning of one or more flow devices of a fluid or water heating system. The fluid system as shown in FIG. 1 includes at least one of at least one fluid heater 34, a bypass valve 18 connected in parallel to the at least one fluid heater 34, at least one valve of package 30 for controlling a fluid flow through the fluid system, at least one pump 24, at least one pressure sensor of package 30 for obtaining a pressure of the fluid flow and at least one flow sensor of package 30 for obtaining a flowrate of the fluid flow. Disclosed herein is a diagnostic method for determining whether flow devices of a fluid system, e.g., the system shown in FIG. 1, function properly. At least one control device is functionally connected to at least some of the flow control devices of the fluid system, e.g., pump 24, bypass valve 18, flow valve and pressure sensor of package 30, etc., such that these flow control devices can be controlled according to hot water demands. The same control device is useful for relaying the conditions, alerts and/or faults raised in real time via, e.g., the internet to remote service personnel or for display locally, on a user interface functionally connected to the control device. The flow devices of a fluid system include at least one of at least one fluid heater, a bypass conductor connected in parallel to the at least one fluid heater, a bypass valve 18 configured to control flow through the bypass conductor, at least one flow valve for controlling a fluid flow through the fluid system, at least one pump 24, at least one pressure sensor for obtaining a pressure of the fluid flow and at least one flow sensor for obtaining a flowrate of the fluid flow. The method includes determining if the fluid flowrate as sensed by the at least one flow sensor, as shown in step 36, is under a threshold. If the fluid flowrate is under the threshold, e.g., about 1 GPM, the bypass valve 18 is closed, the at least one pump is turned off and a first pressure reading is obtained using the at least one pressure sensor, as shown in step 38, at a first time. As used herein, a reading can refer to the result of a single measurement of a sensor value or a plurality of measurements of a sensor value over time, each considered a suitable representation of the quantity being measured. The at least one pump is then turned on and a second pressure reading is obtained using the at least one pressure sensor at a second time as shown in step 40, where the second time is a first delay from the first time. A determination is then made on whether a pressure increase has occurred from the first time to the second time by comparing the second pressure reading P2 to the first pressure reading P1. If the second pressure reading P2 is greater than the first pressure reading P1, the bypass valve 18 is closed, the at least one pump 24 is turned off, a third pressure reading P3 is obtained, as shown in step 44, using the least one pressure sensor at a third time. The bypass valve is opened upon a second delay from the second time and fourth pressure reading is obtained, as shown in step 46, using the at least one pressure sensor at a fourth time. Otherwise, a pump alert is raised and the bypass valve is closed as shown in step 42. An alert, as used herein, refers to a warning intended to be communicated to service personnel but otherwise does not indicate a debilitating malfunction which can cause the shutdown of the fluid system. A fault, as used herein, refers to a problem more severe than an alert and it should be actively sought to be resolved. Nevertheless, a fault does not necessarily mean that the fluid system is required to be shut down as fluid flow control can still be achieved by using alternative means. A determination is made on whether a pressure increase has occurred from the third time to the fourth time by comparing the fourth pressure reading to the third pressure reading. If the fourth pressure reading is greater than the third pressure reading, a flow sensor fault is raised as shown in step 48, otherwise the at least one pump is turned on and a fifth pressure reading is obtained, as shown in step 50, using the at least one pressure sensor at a fifth time. If the fifth pressure reading is greater than the third pressure reading, a flow sensor fault is raised as shown in step 52. Otherwise, a bypass alert is raised and the bypass valve is closed as shown in step 54. In one embodiment, the threshold is about 1 GPM. As specific alerts and faults are raised, service personnel can readily rely on the information conveyed in the alerts and faults for guidance in addressing the anomalies.

Figure 3:
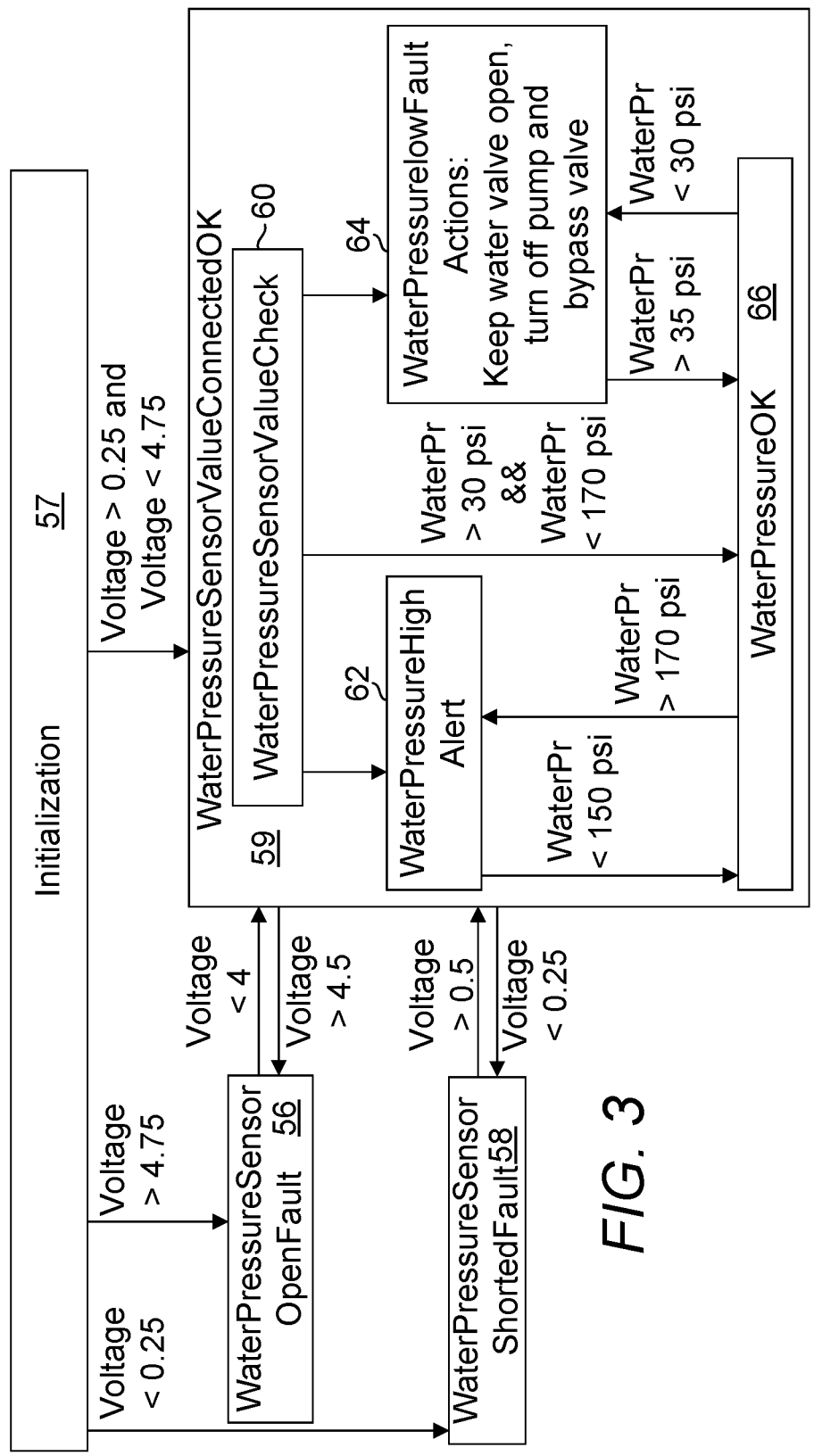
FIG. 3 is a state diagram depicting the behavior of a pressure sensor diagnostic method of a fluid or water heating system.

FIG. 3 is a state diagram depicting the behavior of a pressure sensor diagnostic method of a fluid or water heating system. The diagnostic method is also useful for verifying the proper functioning of flow devices of a fluid system including at least one of at least one fluid heater, a bypass conductor connected in parallel to the at least one fluid heater, a bypass valve configured to control flow through the bypass conductor, at least one flow valve for controlling a fluid flow through the fluid system, at least one pump, at least one pressure sensor for obtaining a pressure of the fluid flow and at least one flow sensor for obtaining a flowrate of the fluid flow. The method includes obtaining a first value corresponding to a pressure of the fluid system using the at least one pressure sensor as shown in an initialization step, i.e., step 57. The first value is compared to an extreme low pressure threshold and an extreme high pressure threshold. If the first value is less than the extreme low pressure threshold, a state of the at least one pressure sensor is transitioned to a pressure sensor shorted fault state 58. If the first value is greater than the extreme high pressure threshold, the state of the at least one pressure sensor is transitioned to a pressure sensor open fault state 56. If the first value falls between the extreme high pressure threshold and the extreme low pressure threshold, the state of the at least one pressure sensor is transitioned to an operating state 59. A second value corresponding to a pressure of the fluid system is obtained in a pressure sensor value check substate 60, using the at least one pressure sensor. While disposed in the operating state 59, if the second value exceeds a high pressure threshold, the state of the at least one pressure sensor is transitioned to the pressure sensor open fault state 56. While also disposed in the operating state 59, if the second value is less than a low pressure threshold, the state of the at least one pressure sensor is transitioned to the pressure sensor shorted fault state. Therefore, depending on the pressure level experienced by the at least one pressure sensor, the at least one pressure sensor is directed to a suitable state in which one or more actions can be taken to address operational anomalies experienced by the fluid system including the at least one pressure sensor. Further, historical data of the state transitions of the at least one pressure sensor also serves to provide insights into the behavior of the fluid system, especially when the state transitions are reviewed concurrently with other sensor, e.g., flow sensor and temperature sensor, etc. or equipment, e.g., pump and heater, etc., data. The extreme high pressure threshold is greater than the high pressure threshold, the high pressure threshold is greater than the low pressure threshold and the low pressure threshold is greater than the extreme low pressure threshold.

In the embodiment shown, the operating state 59 further includes a high pressure alert substate 62, a low pressure fault substate 64, a pressure sensor check substate 60 and a pressure within a suitable operating pressure range substate 66. In one embodiment, the step of transitioning the state of the at least one pressure sensor to the operating state is a transition of the state of the at least one pressure sensor to the pressure within a suitable operating pressure range substate 66 as the at least one pressure sensor indicates a normal operating pressure and no alerts or faults are required to be raised and no corrective actions are required. Upon entering this substate, the state of the at least one pressure sensor needs to be updated periodically. In order to obtain a pressure of the fluid system, the at least one pressure sensor is required to transition into the state in which the concurrent pressure data is obtained, i.e., the pressure sensor check substate 60. In one embodiment, a timer is used to regulate periods between consecutive pressure measurements. Upon expiration of a timer, the state of the at least one pressure sensor transitions to the pressure sensor check substate 60, a substate in which a third value corresponding to a pressure of the fluid system is obtained using the at least one pressure sensor. If the third value is determined to be above a high pressure alert threshold, the state of the at least one pressure sensor transitions to high pressure alert substate 62 and if the third value is determined to be below a lower pressure fault threshold, the state of the at least one pressure sensor transitions to low pressure fault substate 64. In one embodiment, the extreme high pressure threshold is about 4.75 V of a 5 V system and the extreme low pressure threshold is about 0.25 V of a 5 V system. In one embodiment, the high pressure threshold is about 4.5 V of a 5 V system and the extreme low pressure threshold is about 0.5 V of a 5 V system. In one embodiment, the high pressure alert threshold is about 170 psi and the low pressure fault threshold is about 30 psi.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A diagnostic method for assessing the operational performance of a fluid system, the fluid system comprising at least one of at least one fluid heater, a bypass conductor connected in parallel to the at least one fluid heater, a bypass valve configured to control flow through the bypass conductor, at least one flow valve for controlling a fluid flow through the fluid system, at least one pump, at least one pressure sensor for obtaining a pressure of the fluid flow and at least one flow sensor for obtaining a flowrate of the fluid flow, said method comprising:
    (a) determining if the fluid flowrate as sensed by the at least one flow sensor is under a threshold, if the fluid flowrate is under said threshold, closing said bypass valve, turning off the at least one pump, obtaining a first pressure reading using the at least one pressure sensor at a first time;
    (b) turning on the at least one pump and obtaining a second pressure reading using the at least one pressure sensor at a second time, said second time is a first delay from said first time, determining whether a pressure increase has occurred from said first time to said second time by comparing said second pressure reading to said first pressure reading;
    (c) if the second pressure reading is greater than the first pressure reading, closing said bypass valve, turning off the at least one pump, obtaining a third pressure reading using the least one pressure sensor at a third time, opening said bypass valve upon a second delay from said second time and obtaining a fourth pressure reading using the at least one pressure sensor at a fourth time, otherwise raising a pump alert and closing said bypass valve; and
    (d) determining whether a pressure increase has occurred from said third time to said fourth time by comparing said fourth pressure reading to said third pressure reading, if the fourth pressure reading is greater than the third pressure reading, raising a flow sensor fault, otherwise turning on the at least one pump and obtaining a fifth pressure reading using the at least one pressure sensor at a fifth time; and if the fifth pressure reading is greater than the third pressure reading, raising a flow sensor fault, otherwise raising a bypass alert and closing said bypass valve.

2. The diagnostic method of claim 1, wherein said threshold is about 1 GPM.

3. A diagnostic method for assessing the operational performance of a fluid system, the fluid system comprising at least one of at least one fluid heater, a bypass conductor connected in parallel to the at least one fluid heater, a bypass valve configured to control flow through the bypass conductor, at least one flow valve for controlling a fluid flow through the fluid system, at least one pump, at least one pressure sensor for obtaining a pressure of the fluid flow and at least one flow sensor for obtaining a flowrate of the fluid flow, said method comprising:
    (a) obtaining a first value corresponding to a pressure of the fluid system using the at least one pressure sensor and comparing said first value to an extreme low pressure threshold and an extreme high pressure threshold, if said first value is less than said extreme low pressure threshold, transitioning a state of the at least one pressure sensor to a pressure sensor shorted fault state, if said first value is greater than said extreme high pressure threshold, transitioning the state of the at least one pressure sensor to a pressure sensor open fault state, if said first value falls between said extreme high pressure threshold and said extreme low pressure threshold, transitioning the state of the at least one pressure sensor to an operating state; and
    (b) obtaining a second value corresponding to a pressure of the fluid system using the at least one pressure sensor, while disposed in said operating state, if said second value exceeds a high pressure threshold, transitioning the state of the at least one pressure sensor to said pressure sensor open fault state, while disposed in said operating state, if said second value is less than a low pressure threshold, transitioning the state of the at least one pressure sensor to said pressure sensor shorted fault state, wherein said extreme high pressure threshold is greater than said high pressure threshold, said high pressure threshold is greater than said low pressure threshold and said low pressure threshold is greater than said extreme low pressure threshold, wherein said extreme high pressure threshold is about 4.75 V of a 5 V system, said extreme low pressure threshold is about 0.25 V of a 5 V system, said high pressure threshold is about 4.5 V of a 5 V system and said low pressure threshold is about 0.5 V of a 5 V system.

4. The diagnostic method of claim 3, wherein said operating state further comprises a high pressure alert substate, a low pressure fault substate, a pressure sensor check substate and a pressure within a suitable operating pressure range substate, said step of transitioning the state of the at least one pressure sensor to said operating state is a transition of the state of the at least one pressure sensor to said pressure within a suitable operating pressure range substate.

5. The diagnostic method of claim 4, wherein the expiration of a timer causes the state of the at least one pressure sensor to transition to said pressure sensor check substate in which a third value corresponding to a pressure of the fluid system is obtained using the at least one pressure sensor, if said third value is determined to be above a high pressure alert threshold, the state of the at least one pressure sensor transitions to high pressure alert substate and if said third value is determined to be below a lower pressure fault threshold, the state of the at least one pressure sensor transitions to said low pressure fault substate, said high pressure alert threshold is about 170 psi and said low pressure alert threshold is about 30 psi.

6. The diagnostic method of claim 4, wherein said low pressure fault substate comprises keeping said at least one flow valve open, turning off said at least one pump and closing said bypass valve.

* * * * *